(12) United States Patent
Charng

(10) Patent No.: US 6,336,243 B1
(45) Date of Patent: Jan. 8, 2002

(54) STRUCTURE OF A WINDSHIELD WIPER BLADE ASSEMBLY

(75) Inventor: Sheng Kao Charng, Taipei (TW)

(73) Assignee: Clearco Product Limited, Taipei Hsien (TW)

( * ) Notice: Subject to any disclaimer, the term of this patent is extended or adjusted under 35 U.S.C. 154(b) by 33 days.

(21) Appl. No.: 09/605,829

(22) Filed: Jun. 29, 2000

(51) Int. Cl.[7] ............................... B60S 1/28; B60S 1/38
(52) U.S. Cl. .............................. 15/250.201; 15/250.44; 15/250.46; 15/250.41
(58) Field of Search ..................... 15/250.201, 250.44, 15/250.451, 250.48, 250.361, 250.46, 250.47, 250.452, 250.41

(56) References Cited

U.S. PATENT DOCUMENTS

| | | | | |
|---|---|---|---|---|
| 3,942,212 A | * | 3/1976 | Steger et al. | 15/250.201 |
| 4,953,251 A | * | 9/1990 | Chow | 15/250.44 |
| 5,335,393 A | * | 8/1994 | Charng | 15/250.201 |
| 5,546,627 A | * | 8/1996 | Chen | 15/250.46 |
| 5,666,687 A | * | 9/1997 | Charng | 15/250.201 |
| 5,819,362 A | * | 10/1998 | Charng | 15/250.201 |
| 5,862,567 A | * | 1/1999 | Kim | 15/250.201 |

FOREIGN PATENT DOCUMENTS

| | | | | |
|---|---|---|---|---|
| GB | 2030447 | * | 4/1980 | 15/250.44 |

* cited by examiner

Primary Examiner—Gary K. Graham
(74) Attorney, Agent, or Firm—A & J

(57) ABSTRACT

A windshield wiper blade assembly includes an arched casing having an intermediate portion provided with a seat provided a rod, the arched casing having two arms each provided with a pair of opposite first pins, a pair of master blade holders each having a spoiler with two gradually decreasing ends each formed with a recess and provided with two aligned holes, the spoiler having two turbulent holes and a through hole between the two turbulent holes, the arched casing being engaged with the master blade holders with the pins engaged with the aligned holes, the master blade holders having a bottom formed with two longitudinal grooves, a pair of assistant blade holders each having an intermediate portion provided with a protruded end configured to engage with the recess of the spoiler, two second pins arranged under the protruded end adapted to engage with the aligned holes of the master blade holder, and a bottom provided with two protuberances each having a longitudinal groove, and a rubber blade fitted in the longitudinal grooves of the master and assistant blade holders, whereby a high downward pressure will be provided to the rubber blade against a windshield upon bearing of force of wind.

2 Claims, 7 Drawing Sheets

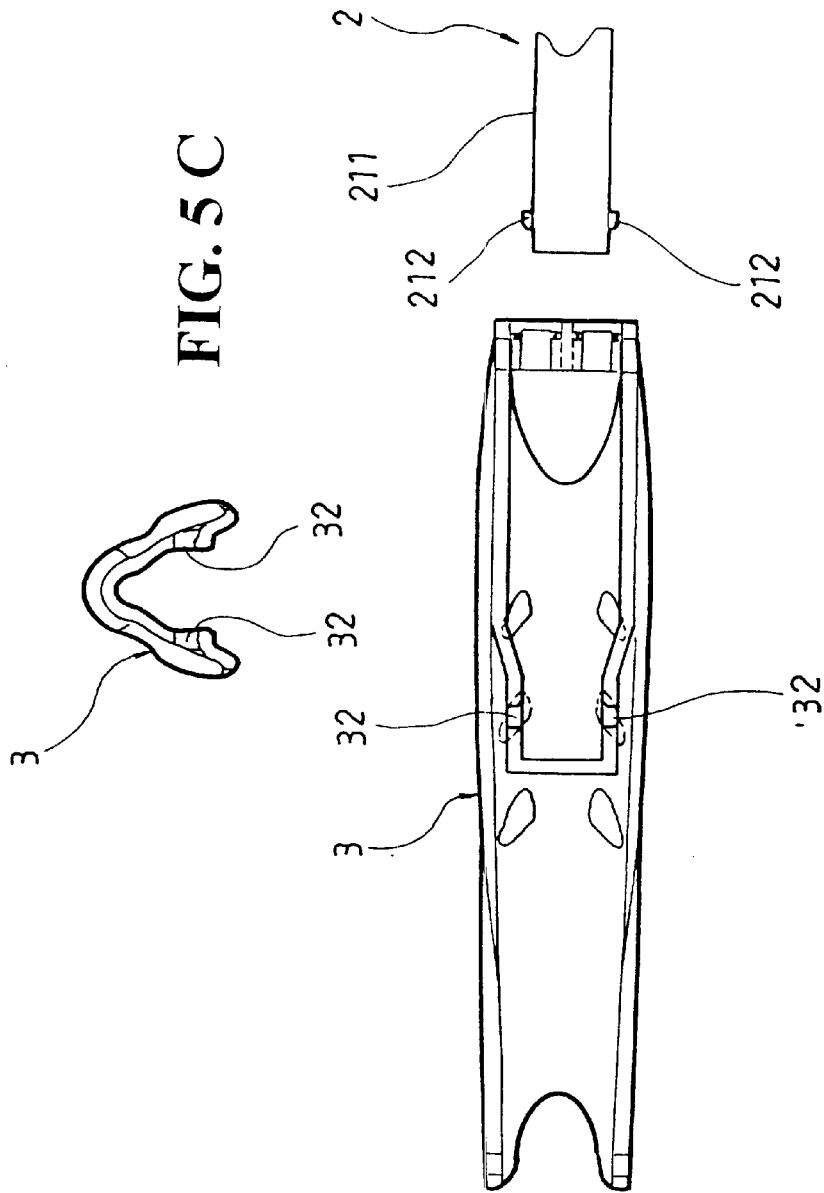

STRUCTURE OF A WINDSHIELD WIPER BLADE ASSEMBLY

BACKGROUND OF THE INVENTION

1. Field of the Invention

This invention is related to an improvement in the structure of a windshield wiper blade assembly and in particular to one which can provide a high downward pressure to the rubber blade against the windshield upon the bearing of the force of the wind.

2. Description of the Prior Art

Referring to FIG. 1, the conventional windshield wiper blade assembly includes an arched casing 11 for connection to a wiper drive arm 15, a rubber blade 14, two assistant blade holders 13 fastened to the top of the rubber blade 14, and two master blade holders 12 pivoted to two opposite ends of the arched casing 11 and connected between two opposite ends of the rubber blade 14 and the hvo assistant blade holders 13. When in use, the side wall of the arched casing 11 bears the force of the wind, and so when the force of the wind increases, the arched casing 11 tends to be forced to vibrate the rubber blade 14. However, as the rubber blade 14 is vibrated, it cannot remove rain water from the windshield effectively. Hence, it has been proposed to form a spoiler 17 extending outwardly from one side of the arched casing 11 so as to increase the thrust on the windshield wiper. However, the downward pressure on the assistant blade holders is insufficient to keep from vibration because of the following reason:

Suppose the pressure exerted on the arched casing 11 be equal to 100 units (i.e. 50 units of the pressure exerted by the wiper drive arm 15 plus 50 units of the pressure exerted by the spoiler 17), and 20% of the pressure be reduced for each connection. Then, the pressure transmitted from the arched casing 11 to the master blade holder 12 will be reduced by 20% of the pressure exerted on the arched casing 11. That is, 100 units×(100−20)/100=80 units. Similarly, the pressure transmitted from the master blade holder 12 to the assistant blade holder 13 will be reduced by 20% of the pressure exerted on the master blade holder 12. That is, 80 units× (100−20)/100=64 units. Accordingly, the pressure exerted on the assistant blade holder 13 will be only 64% of the pressure exerted on the arched casing 11, thereby malting it insatisfactory in use.

Therefore, it is an object of the present invention to provide an improvement in the structure of a windshield wiper blade assembly which can obviate and mitigate the above-mentioned drawbacks.

SUMMARY OF THE INVENTION

This invention is related to an improvement in the structure of a windshield wiper blade assembly.

According to a preferred embodiment of the present invention, a windshield wiper blade assembly includes an arched casing having an intermediate portion provided with a seat provided a rod, the arched casing having two arms each provided with a pair of opposite first pins, a pair of master blade holders each having a spoiler with two gradually decreasing ends each formed with a recess and provided with two aligned holes, the spoiler having two turbulent holes and a through hole between the two turbulent holes, the arched casing being engaged with the master blade holders with the pins engaged with the aligned holes, the master blade holders having a bottom formed with two longitudinal grooves, a pair of assistant blade holders each having an intermediate portion provided with a protruded end configured to engage with the recess of the spoiler, two second pins arranged under the protruded end adapted to engage with the aligned holes of the master blade holder, and a bottom provided with two protuberances each having a longitudinal groove, and a rubber blade fitted in the longitudinal grooves of the master and assistant blade holders.

It is the primary object of the present invention to provide an improvement in the structure of a windshield wiper blade assembly which can provide a high downward pressure to the rubber blade against the windshield upon the bearing of the force of the wind.

It is another object of the present invention to provide an improvement in the structure of a windshield wiper blade assembly which is durable in use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
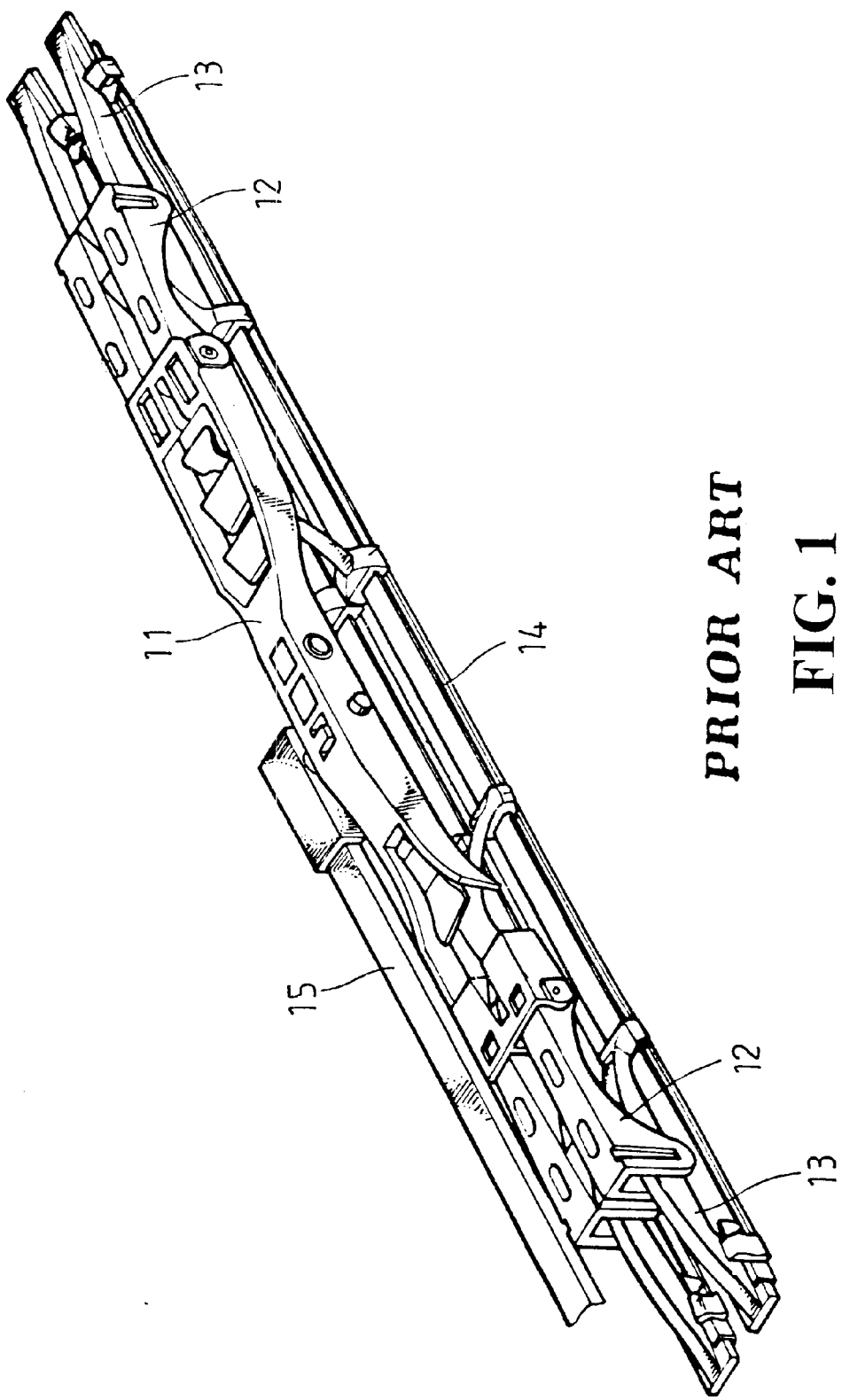
FIG. 1 is a perspective view of a prior art windshield wiper blade assembly.
Figure 2:
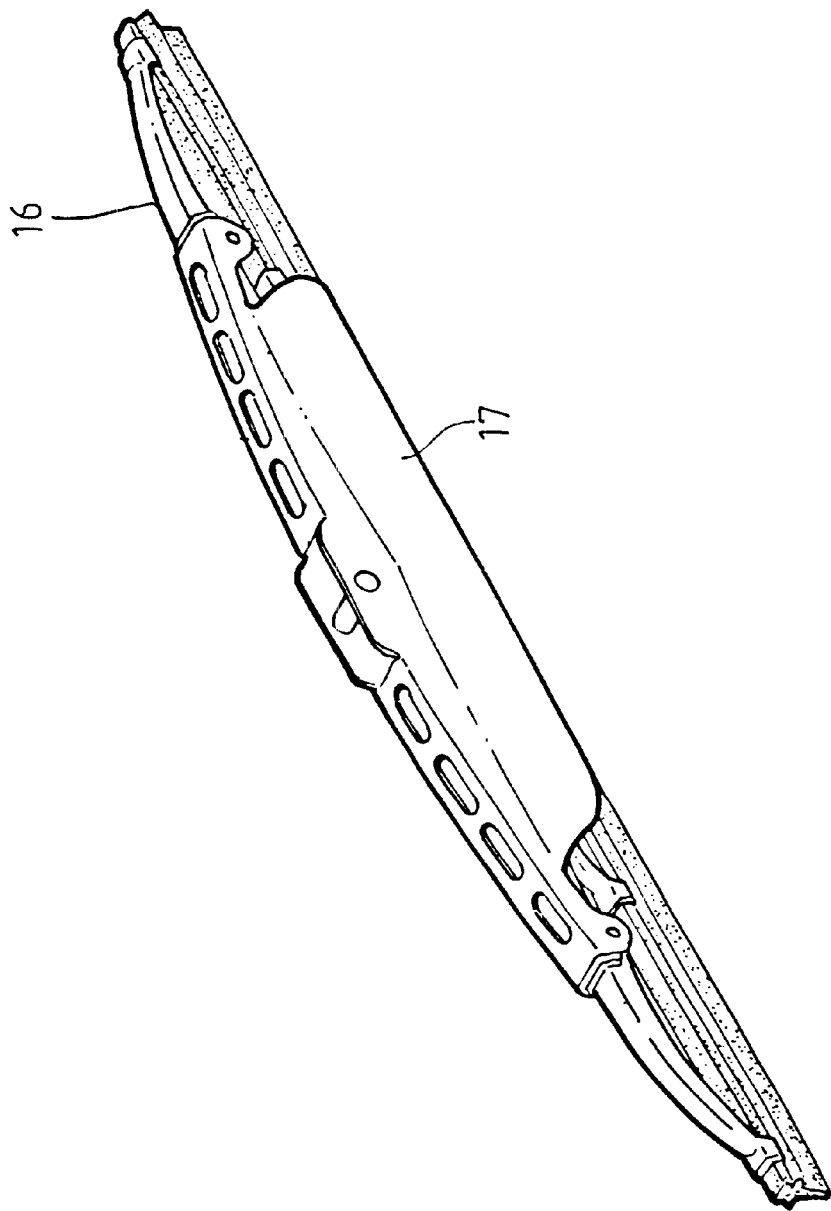
FIG. 2 is a perspective view of another prior art windshield wiper blade assembly.
Figure 3:
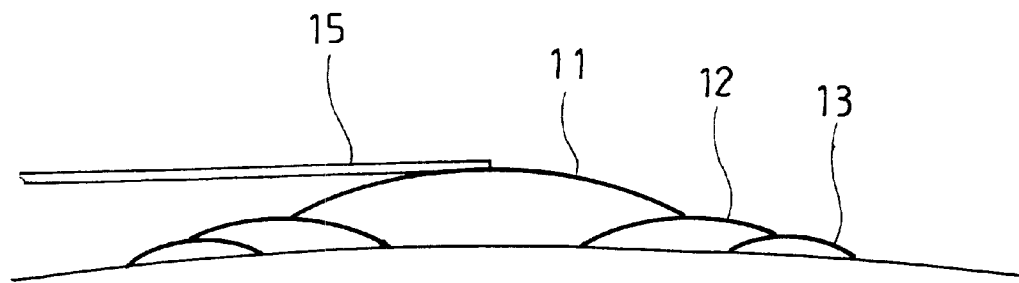
FIG. 3 is a schematic view illustrating the structure of a prior art windshield wiper blade assembly.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would nornally occur to one skilled in the art to which the invention relates.

Figure 4:
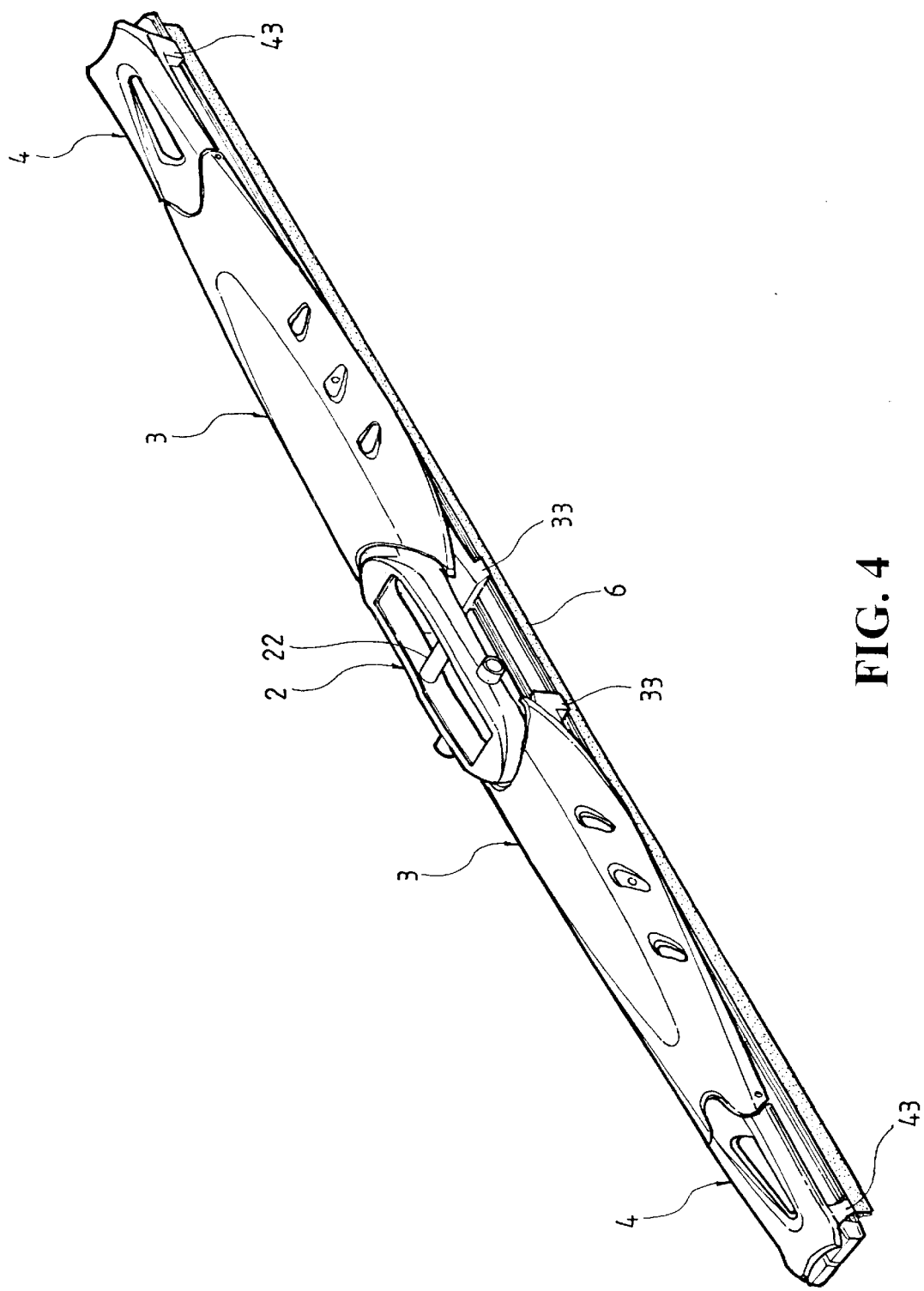
FIG. 4 is a perspective view of an improved windshield wiper blade assembly according to the present invention.
Figure 5:
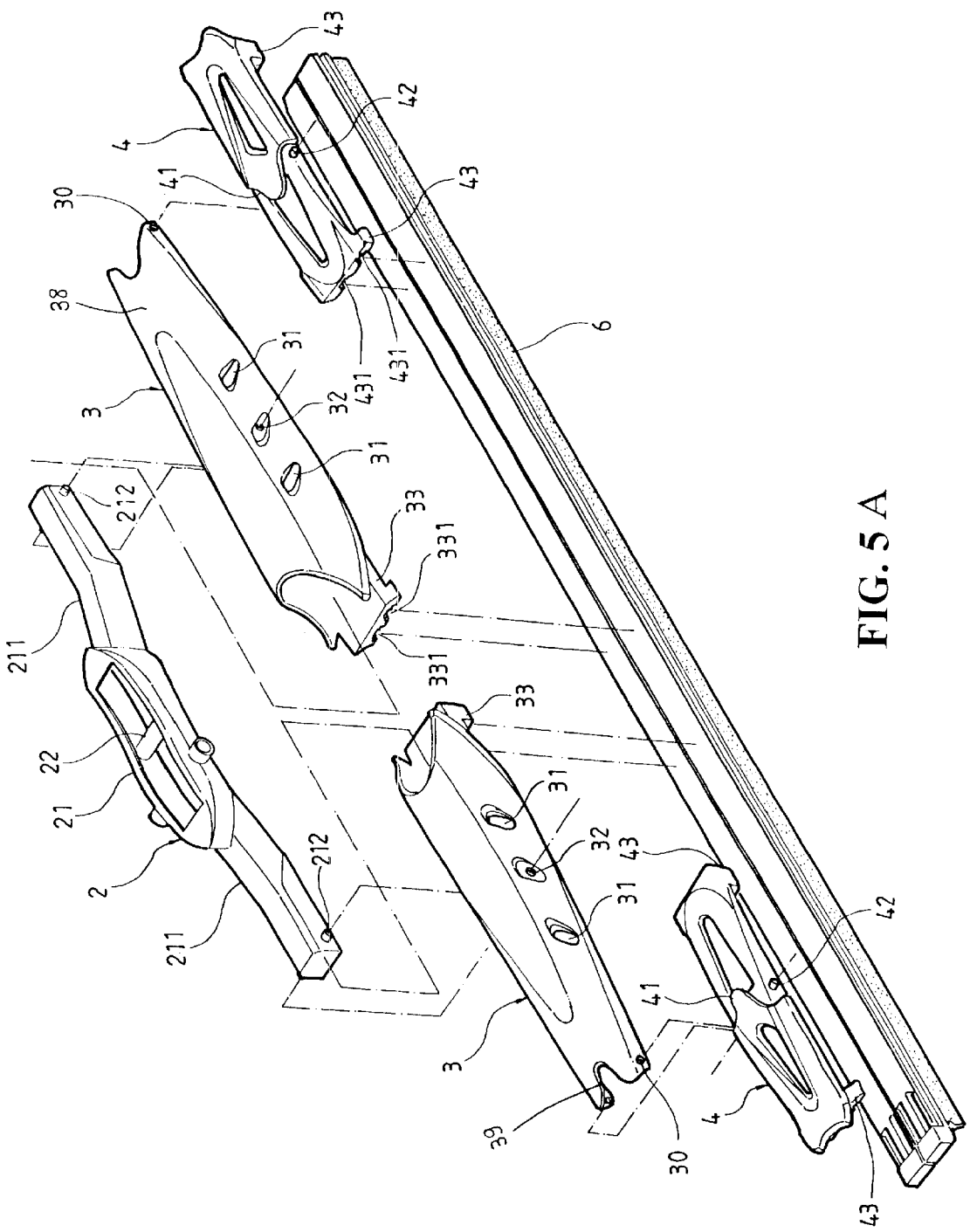
FIG. 5A is an exploded view of the present invention.
FIG. 5B is an exploded view of a portion of the present invention.
FIG. 5C is a side view of the master blade holder.

With reference to the drawings and in particular to FIGS. 4, 5A and 5B thereof, the windshield wiper blade assembly according to the present invention generally comprises an arched casing 2, a pair of master blade holders 3, a pair of assistant blade holders 4, and a rubber blade 6. The arched casing 2 has a seat 21 at the intermediate portion thereof which is formed with a rod 22 therein. The arched casing 2 has two arms 211 each provided with a pair of opposite pins 212.

The master blade holder 3 has a spoiler 38 with two gradually decreasing ends each formed with a recess 39 and provided with two aligned holes 30. The spoiler 38 of the master blade holder 3 is formed with two turbulent holes 31 and a through hole 32 between the two turbulent holes 31. The arched casing 2 is engaged with the master blade holders 3, with the pins 212 of the former engaged with the through holes 32 of the latter. The bottom of the master blade holder 3 is formed with two longitudinal grooves 331.

The assistant blade holder 4 is a slightly arched member having a protruded end 41 at the intermediate portion configured to engage with the recess 39 of the spoiler 3, two pins 42 arranged under the protruded end 41 adapted to engage with the through holes 30 of the master blade holder 3, and two protuberances 43 at the bottom of an outer end each having a groove 431.

Each arm 211 of the arched casing 2 is inserted into a respective one of the master blade holder 3, with the pins 212 of the former pivotally connected with the through hole 32 of the latter. The pins 212 of the arched casing 2 are chamfered at the front end thereof and the through holes 32 of the master blade holder 3 are also chamfered for facilitating the engagement between the pins 212 of the arched casing 2 and the through holes 32 of the master blade holder 3 (see FIGS. 5B and 5C). The assistant blade holder 4 is inserted into the smaller end of the master blade holder 3, with the pins 42 of the former engaged with the through holes 30 of the latter. The top rubber blade 6 is inserted into the grooves 431 of the assistant blade holders 4 and the grooves 331 of the master blade holders 3. Hence, the arms 211 of the arched casing 2 are fitted within the master blade holders 3, so that the arched casing 2 is forced to go downwardly by the master blade holders 3 and the master blade holders 3 may have a larger spoiler for increasing the downward pressure on the windshield wiper blade assembly.

Figures 6A, 6B:
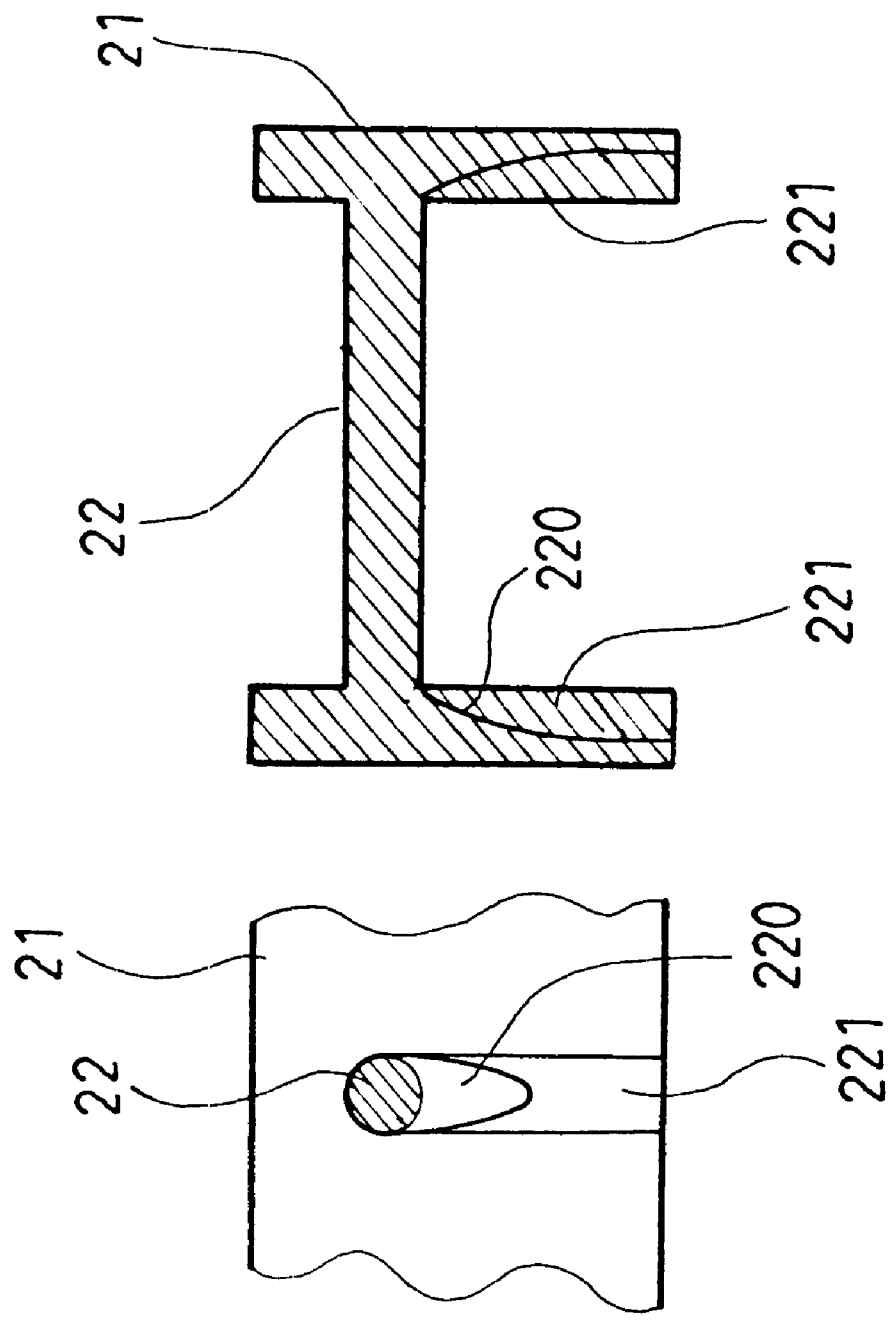
FIG. 6A is a fragmentary view of the seat.
FIG. 6B is a sectional view of the seat.

Referring to FIGS. 6A and 6B, the rod 22 of the arched casing 2 is designed to be connected with a wiper drive arm (not shown) and the seat 21 is formed with an elongated cavity 221 and a curved rib 220 under the rod 22 for reinforcing the structure of the seat 21 thereby prolonging its service life.

Figure 7:
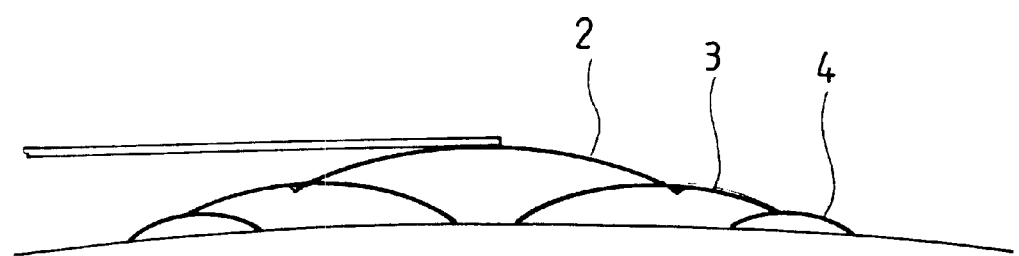
FIG. 7 is a schematic view illustrating the structure of the present invention.

Turning now to FIG. 7, the master blade holders 3 are pulled downwardly by the arched casing 2, so that the downward pressure on the wiper blade assembly will be increased because of the following reason:

Suppose the pressure exerted on the arched casing 2 by the wiper drive arm be 50 units, the pressure exerted on the master blade holder 3 by the spoilers 38 be 50 units, and 20% of the downward pressure be reduced for each connection. Then, the pressure transmitted from the arched casing 2 to the master blade assembly 3 will be equal to 50 units×(100−20)/100=40 units. As the pressure exerted on the master blade assembly 3 by the spoilers 38 is equal to 50 units, the total pressure exerted on the master blade holders 3 is equal to 50 units+40 units=90 units. As a consequence, the pressure transmitted from the master blade holders 3 to the assistant blade holders 4 is equal to 90 units×(100−20)/100=72 units. Accordingly, the downward pressure (72 units) on the assistant blade holders 4 of the present invention is obviously higher than the downward pressure (64 units) of the assistant blade holders 13 (see FIG. 1) of the prior art, thereby providing a higher downward pressure to the rubber blade against the windshield upon the bearing of the force of the wind.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A windshield wiper blade assembly comprising:

an arched casing having an intermediate portion provided with a seat provided a rod, said arched casing having two arms each provided with a pair of opposite first pins;

a pair of master blade holders each having a spoiler with two gradually decreasing ends each formed with a recess and provided with two aligned holes, said spoiler having two turbulent holes and a through hole between said two turbulent holes, said arched casing being engaged with said master blade holders with said pins engaged with said through holes, said master blade holders having a bottom formed with two longitudinal grooves;

a pair of assistant blade holders each having an intermediate portion provided with a protruded end configured to engage with said recess of said spoiler, two second pins arranged under said protruded end adapted to engage with said aligned holes of said master blade holder, and a bottom provided with two protuberances each having a longitudinal groove; and a rubber blade fitted in said longitudinal grooves of said master and assistant blade holders;

whereby a high downward pressure will be provided to said rubber blade against a windshield upon bearing of force of wind.

2. The windshield wiper blade assembly as claimed in claim 1, wherein said seat is formed with an elongated cavity and a curved rib under said rod for reinforcing structure thereof.

* * * * *